US008103891B2

(12) United States Patent
Good et al.

(10) Patent No.: US 8,103,891 B2
(45) Date of Patent: Jan. 24, 2012

(54) EFFICIENT LOW POWER RETRIEVAL TECHNIQUES OF MEDIA DATA FROM NON-VOLATILE MEMORY

(75) Inventors: Gary D. Good, Escondido, CA (US); Kuntal D. Sampat, San Diego, CA (US); Christopher H. Bracken, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 12/405,064

(22) Filed: Mar. 16, 2009

(65) Prior Publication Data

US 2009/0240967 A1    Sep. 24, 2009

Related U.S. Application Data

(60) Provisional application No. 61/037,450, filed on Mar. 18, 2008.

(51) Int. Cl.
| G06F 1/00 | (2006.01) |
| G06F 1/32 | (2006.01) |
| G06F 15/16 | (2006.01) |
| G06F 15/00 | (2006.01) |
| G06F 11/00 | (2006.01) |
| H04N 7/12 | (2006.01) |
| H04N 5/93 | (2006.01) |
| G06K 9/36 | (2006.01) |

(52) U.S. Cl. ............... 713/323; 713/320; 375/240.01; 382/232; 386/353; 709/208; 712/28; 712/32; 714/2

(58) Field of Classification Search ............ 713/320, 713/323; 375/240.01; 382/232; 386/353; 709/208; 712/28, 32; 714/2
See application file for complete search history.

(56) References Cited

U.S. PATENT DOCUMENTS

| 5,680,504 | A | * | 10/1997 | Kopp ........................... 704/201 |
| 5,748,983 | A | | 5/1998 | Gulick et al. |
| 5,892,966 | A | | 4/1999 | Petrick et al. |
| 7,496,770 | B2 | | 2/2009 | Gupta |
| 7,814,304 | B2 | * | 10/2010 | Cornwell et al. .............. 713/1 |
| 2002/0087225 | A1 | * | 7/2002 | Howard ......................... 700/94 |
| 2008/0288711 | A1 | * | 11/2008 | Jung et al. .................... 711/102 |

FOREIGN PATENT DOCUMENTS

| EP | 0945778 | 9/1999 |
| EP | 1221645 | 7/2002 |

OTHER PUBLICATIONS

International Search Report & Written Opinion—PCT/US09/037515 International Search Authority—European Patent Office—Jun. 9, 2009.

* cited by examiner

*Primary Examiner* — Stefan Stoynov
(74) *Attorney, Agent, or Firm* — Espartaco Diaz Hidalgo

(57) ABSTRACT

Power consumption may be reduced in a media device including a first processor coupled to the non-volatile memory, either directly or indirectly, allowing the first processor to generate a pointer structure. The first processor may also be coupled, either directly or indirectly to a memory space, allowing the first processor to write the pointer structure in the memory space. The media device includes a second processor, such as a DSP/SHW or peripheral processor, and may be also be coupled, either directly or indirectly to the memory space, allowing the second processor to retrieve a block of media data from the non-volatile memory. Retrieval of the block of media data may be read directly from the non-volatile memory, or in some cases, the media data being retrieved may be parsed. The media data may be an audio file data, video file data, or both.

38 Claims, 12 Drawing Sheets

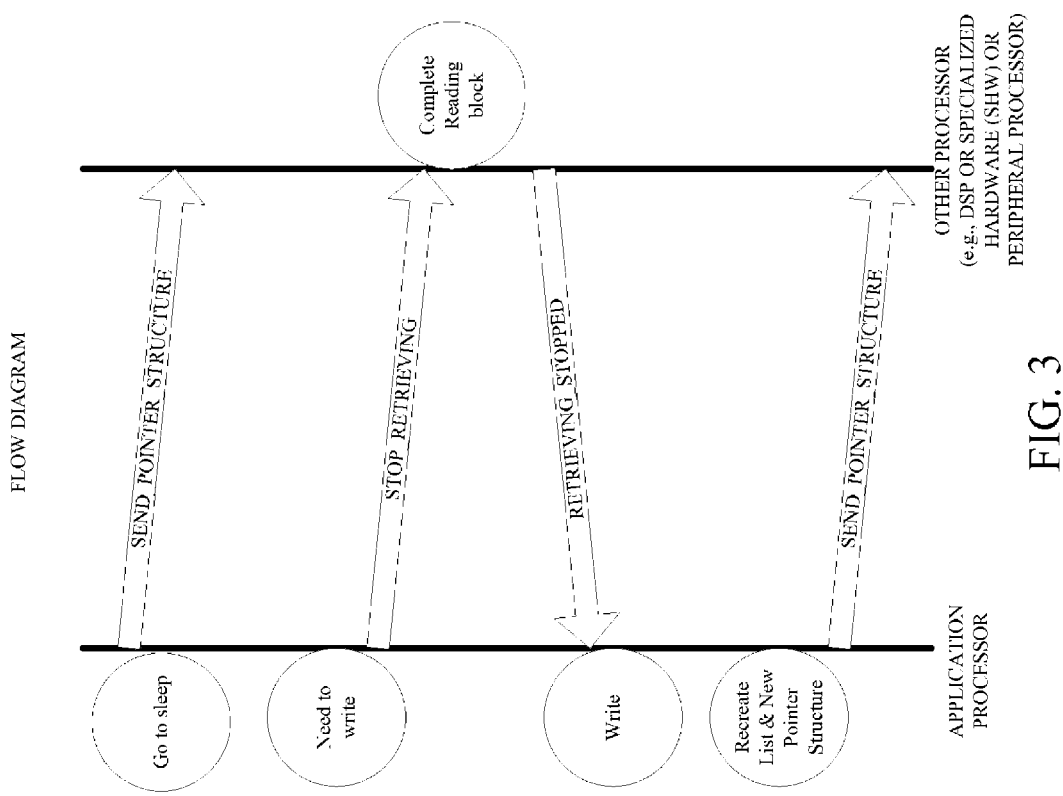

EFFICIENT LOW POWER RETRIEVAL TECHNIQUES OF MEDIA DATA FROM NON-VOLATILE MEMORY

CLAIM OF PRIORITY UNDER 35 U.S.C. §119

The present Application for patent claims priority to Provisional Application No. 61/037,450, entitled "EFFICIENT RETRIEVAL TECHNIQUES OF DATA FROM MEMORY," filed Mar. 18, 2008, which is assigned to the assignee hereof.

TECHNICAL FIELD

The present disclosure relates generally to computers and computer-related technology. More specifically, the present disclosure relates to efficient techniques for retrieval of compressed files from non-volatile memory. The techniques that may be utilized in computing devices, including mobile computing devices.

BACKGROUND

Computing devices have an operating system. The operating system is a software program that enables the execution of software applications on the computing devices hardware. The operating system is loaded on a processor located in the computing device. Many applications have found there way onto mobile devices. Some of these applications involve audio processing and/or video processing.

The term audio processing may refer to the processing of audio signals. Similarly, the term video processing may refer to the processing of video signals. Audio signals are electrical signals that represent audio, i.e., sounds that are within the range of human hearing. Similarly, video signals are electrical signals that represent video. Audio or video signals may be either digital or analog. Many different types of computing devices may utilize audio and video processing techniques. Examples of such computing devices include desktop computers, laptop computers, workstations, wireless communication devices, wireless mobile devices, personal digital assistants (PDAs), smart phones, iPods, MP3 players, handheld gaming units or other media players, and a wide variety of other consumer devices. As used herein any of these examples of computing devices are considered "media devices".

Audio compression is a form of data compression that is designed to reduce the size of audio files. There are many different audio compression algorithms that are in use today. Some examples of audio compression algorithms include MPEG-1 Audio Layer 3 (MP3), Advanced Audio Coding (AAC), High Efficiency AAC (HE-AAC), HE-AAC version 2 (HE-AAC v2), Windows Media Audio (WMA), WMA Pro, etc.

Similarly video compression (which sometimes may be used to compress pictures as well as video) is a form of data compression that is designed to reduce the size of video (or picture) files. There are many different video compression algorithms that are also in use today. Some examples of video compression algorithms include JPEG Base Profile, JPEG2000, MPEG-1, MPG-2, MPEG-4 Simple Profile, MPEG-4 Advanced Simple Profile, H.263 Base Profile, H.264 Base Profile, H.264 Main Profile, Windows Media Video 9 series, including the VC1 standard, etc.

The audio file or video file may have different formats depending on the audio or video compression algorithms used to compress the audio or video signals. The compressed data may sometimes be referred to as a bitstream. The bitstream (i.e., the compressed audio file or compressed video file) may be stored in a memory. Sometimes the bitstream is encrypted or stored in a format associated with an operating system of the computer or mobile device. To decompress the bitstream (since it may represent compressed data) and to decrypt the bitstream (if it is encrypted) requires many computations per second.

The processor (sometimes called an application processor) which runs the application software interacts with a specialized processor. One type of specialized processor is known as a digital signal processor (DSP). The application processor where the operating system is loaded retrieves the bitstream from memory and passes it to the DSP to decrypt and/or decompress. Processing a bitstream in this manner often consumes a lot of power. Finding a technique to process the bitstream at a lower power is desired.

SUMMARY

According to one aspect, a method of reducing power in a media device includes generating a pointer structure, by a first processor, of media data stored in a non volatile memory; writing the pointer structure, by the first processor, into a memory space which is accessible by a second processor; reading the pointer structure from the memory space, by the second processor; and retrieving a block of the media data from the non-volatile memory, by the second processor, based on the pointer structure.

According to another aspect, a media device includes a non-volatile memory with stored media data; a first processor, coupled to the non-volatile memory, configured to generate a pointer structure which comprises a location and size of the media data stored in the non-volatile memory; a memory space to store the pointer structure written by the application processor; and a second processor, configured to read the pointer structure from the memory space and, configured to retrieve a block of the media data from the non-volatile memory.

According to another aspect, a media device includes means for generating a pointer structure, by an application processor, of media data stored in a non volatile memory; means for writing the pointer structure, by the application processor, into a memory space which is accessible by a different processor; means for reading the pointer structure from the memory space, by the different processor; and means for retrieving the media data from the non-volatile memory, by the different processor, based on the pointer structure.

According to a further aspect, a computer-readable medium, embodying a set of instructions executable by one or more processors, includes code for generating a pointer structure, by a first processor, of media data stored in a non volatile memory; code for writing the pointer structure, by the first processor, into a memory space which is accessible by a second processor; code for reading the pointer structure from the memory space, by the second processor; and code for retrieving a block of the media data from the non-volatile memory, by the second processor, based on the pointer structure.

Other aspects, features, methods and advantages will be or will become apparent to one with skill in the art upon examination of the following figures and detailed description. It is intended that all such additional features, aspects, methods and advantages be included within this description and be protected by the accompanying claims.

It is to be understood that the drawings are solely for purpose of illustration. Furthermore, the components in the figures are not necessarily to scale, emphasis instead being placed upon illustrating the principles of the techniques and devices described herein. In the figures, like reference numerals designate corresponding parts throughout the different views.

Figure 2A:
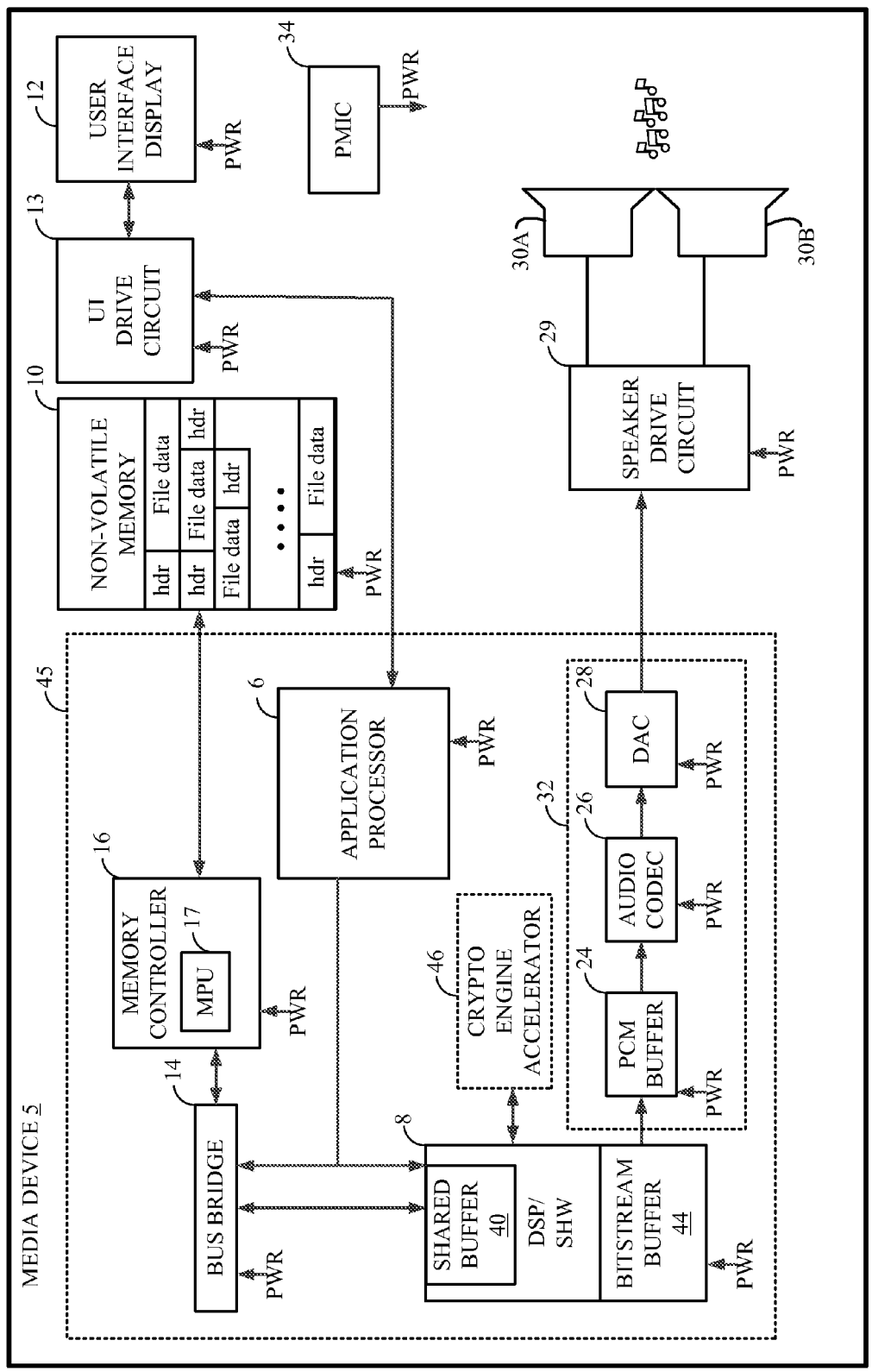
FIG. 2A is a block diagram illustrating an exemplary media device that implements techniques for processing audio files by using a different processor (other than an application processor) to retrieve the files from memory.
Figure 2B:
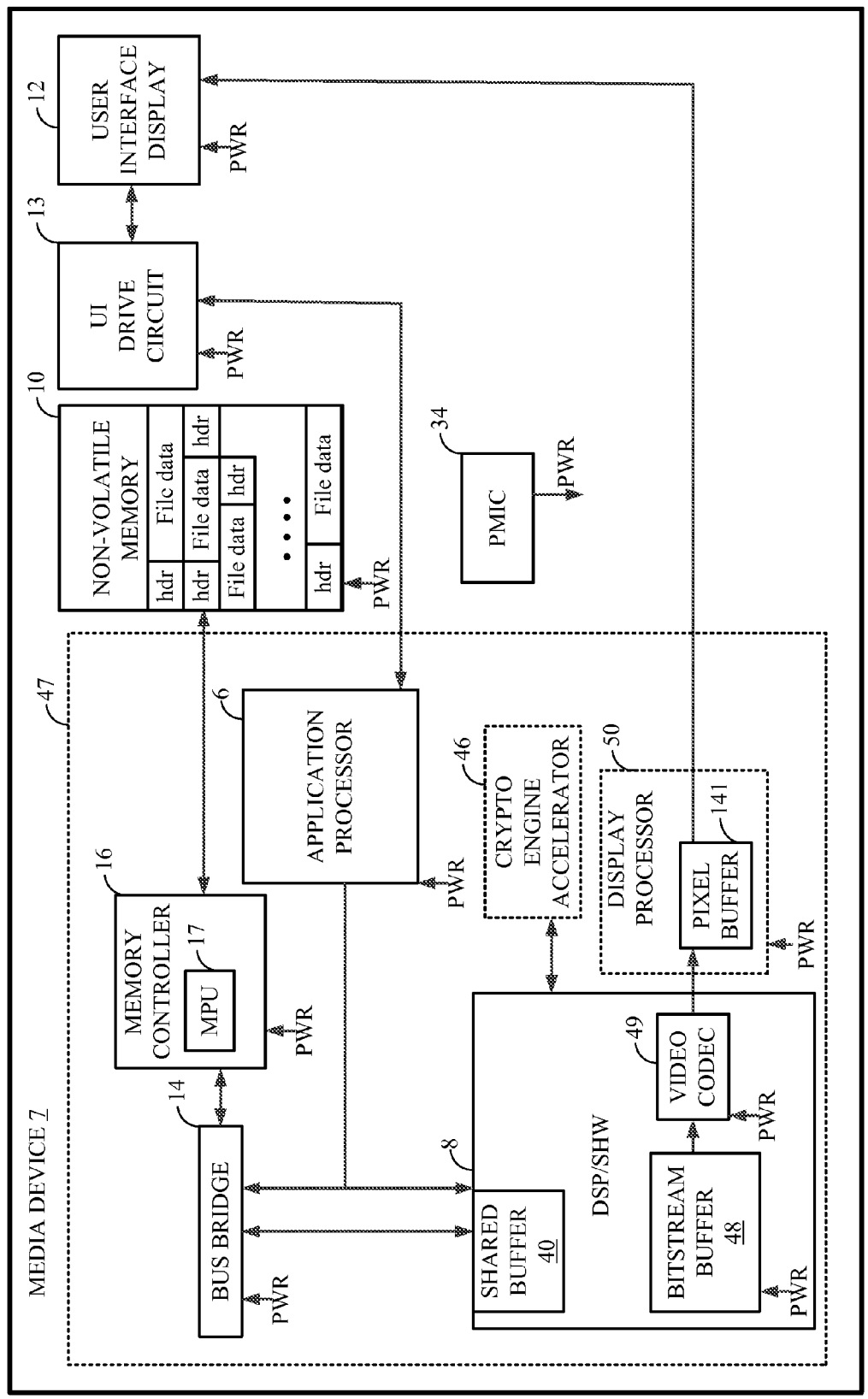
FIG. 2B is a block diagram illustrating an exemplary media device that implements techniques for processing video files by using a different processor (other than an application processor) to retrieve the files from memory.
Figure 2C:
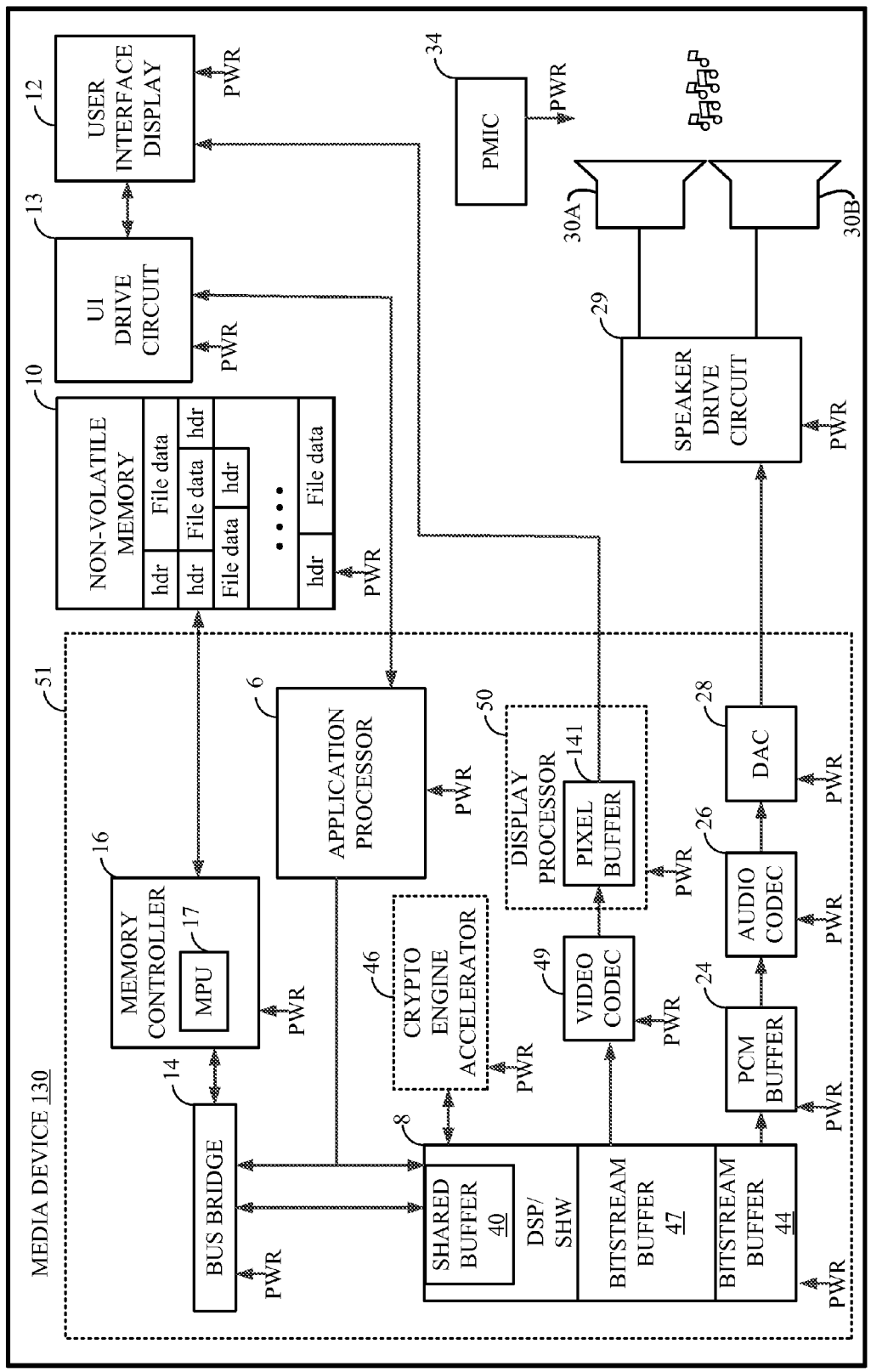

In an alternate embodiment, the common architecture illustrated between FIG. 2A and FIG. 2B and the differences between the architectures illustrated between FIG. 2A and FIG. 2B form the media device illustrated in FIG. 2C.

FIG. 3 illustrates a flow diagram of the process of writing to a non-volatile memory by an application processor after a different processor, such as a peripheral processor or DSP, has been retrieving data from the non-volatile memory.

Figure 4A:
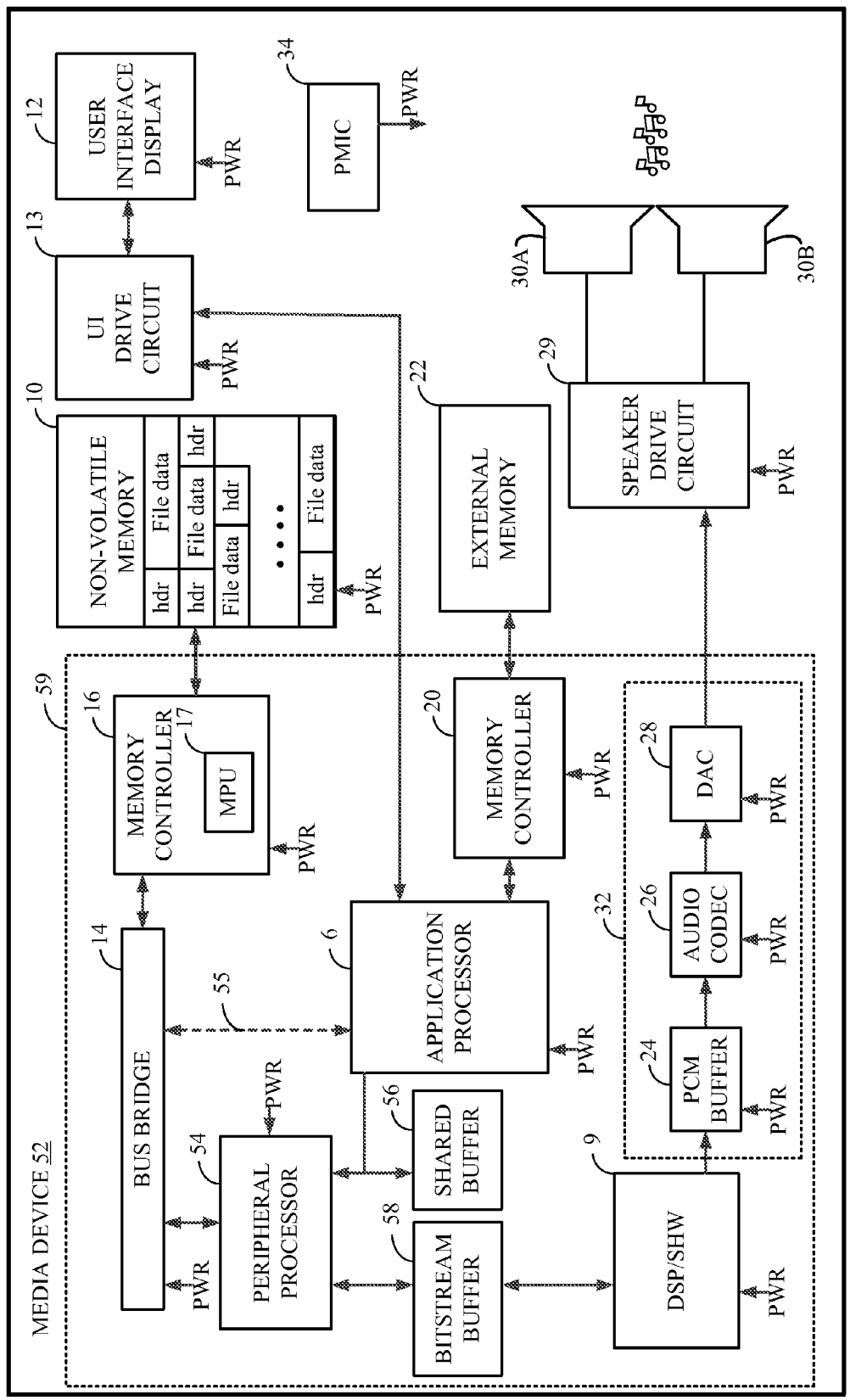
Figure 4B:
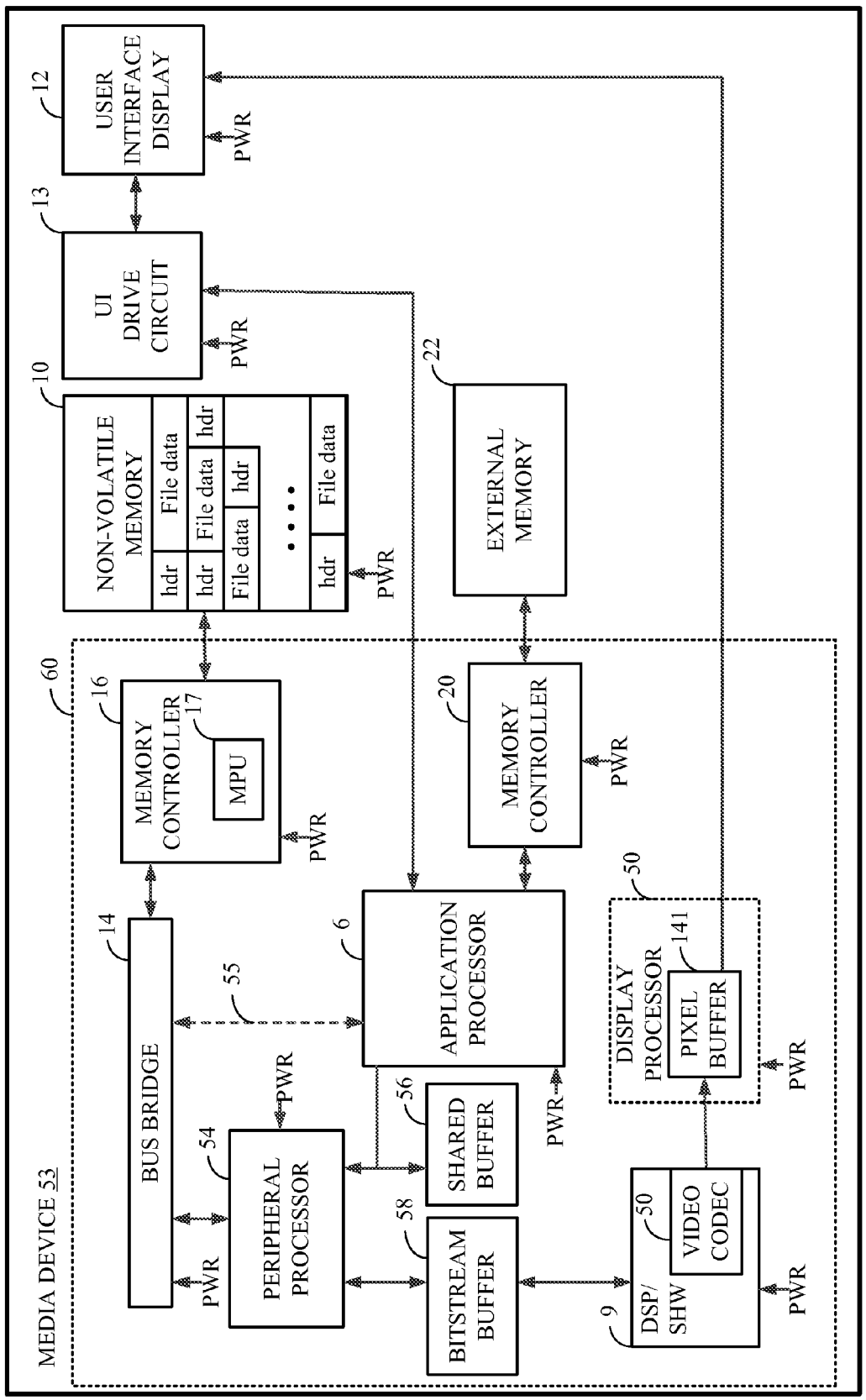
Figure 4C:
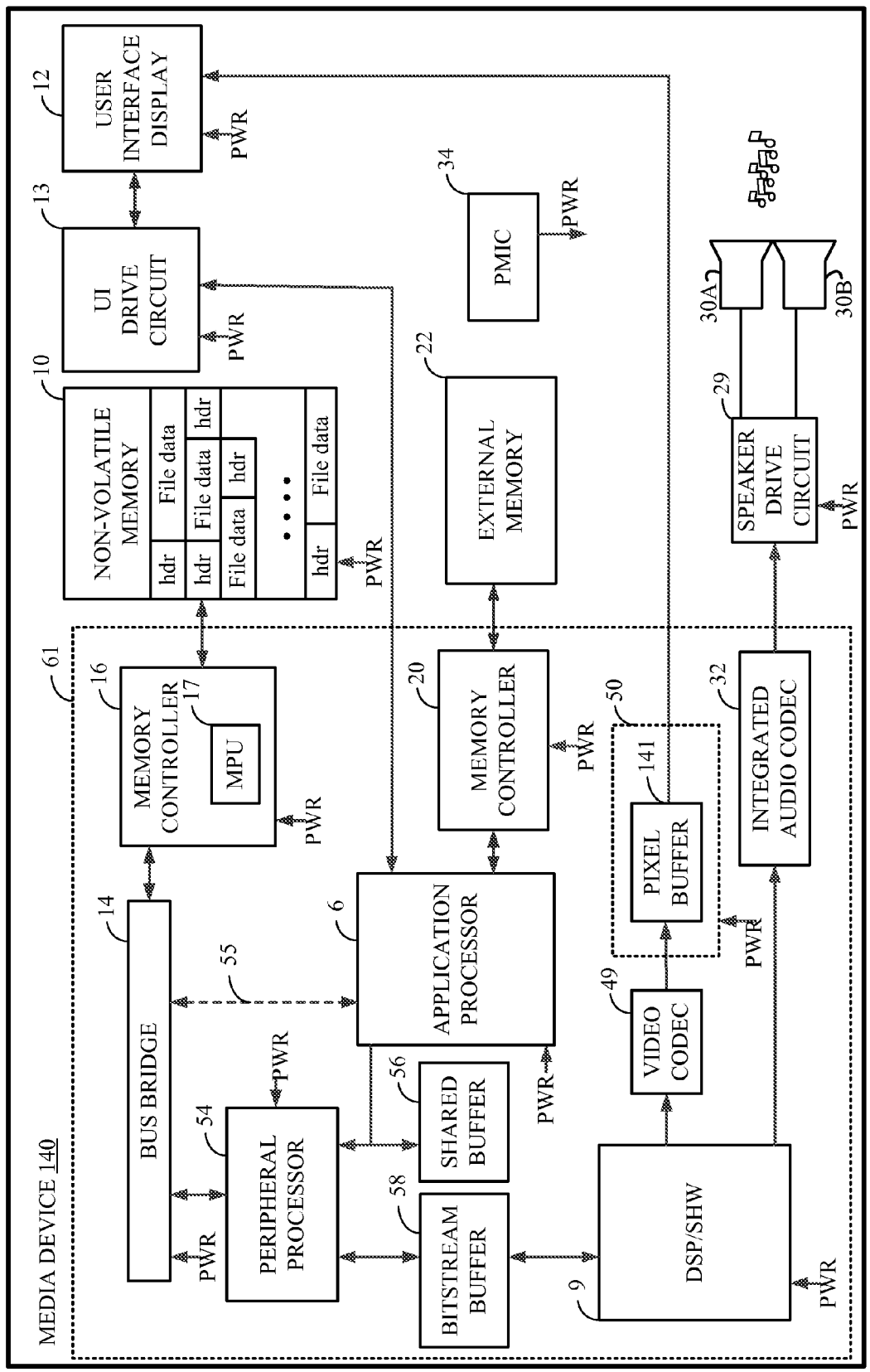
Figure 5:
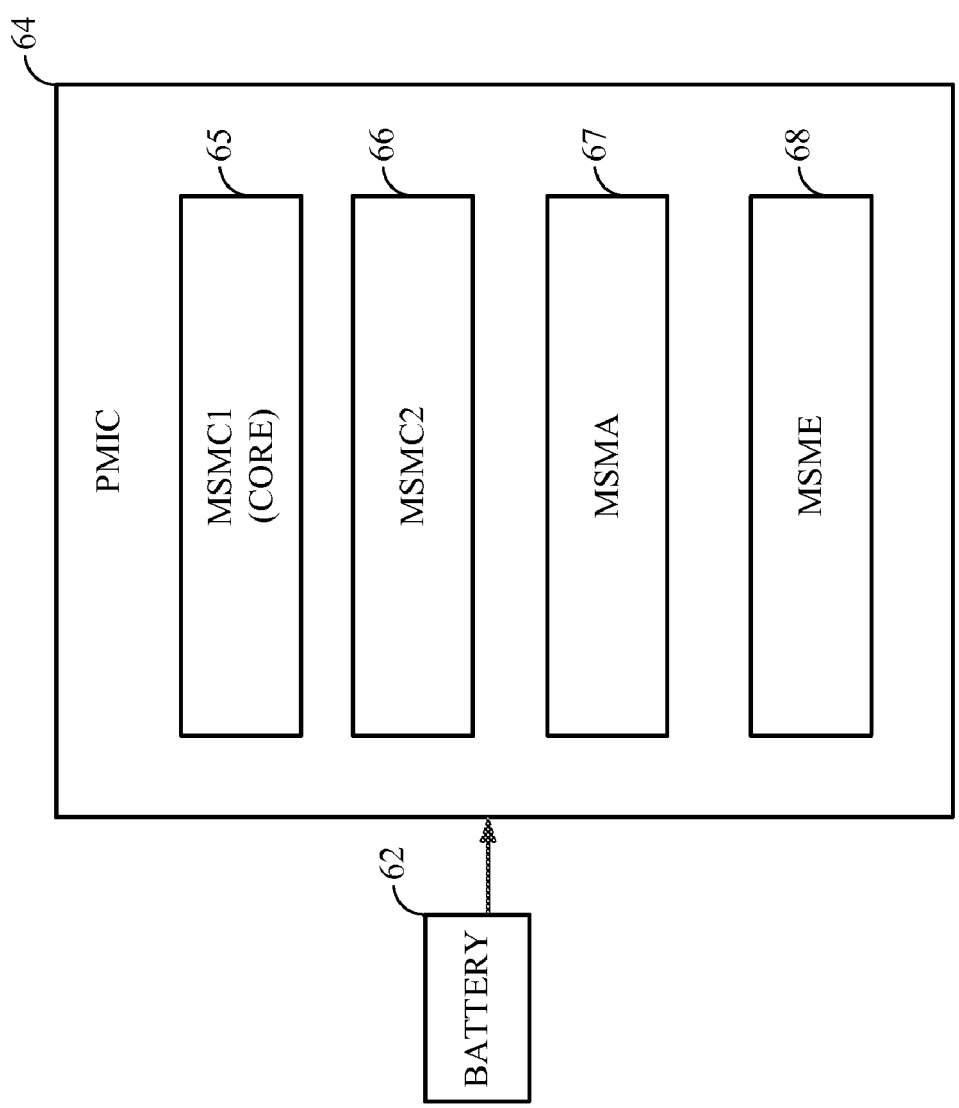

FIG. 4A is an alternate embodiment of FIG. 2A,

FIG. 4B is an alternate embodiment of FIG. 2B,

In an alternate embodiment, the common architecture illustrated between FIG. 4A and FIG. 4B and the differences between the architectures illustrated between FIG. 4A and FIG. 4B form the media device 140 illustrated in FIG. 4C FIG. 5 is a block diagram of one example of a power management integrated circuit (PMIC).

Figure 6A:
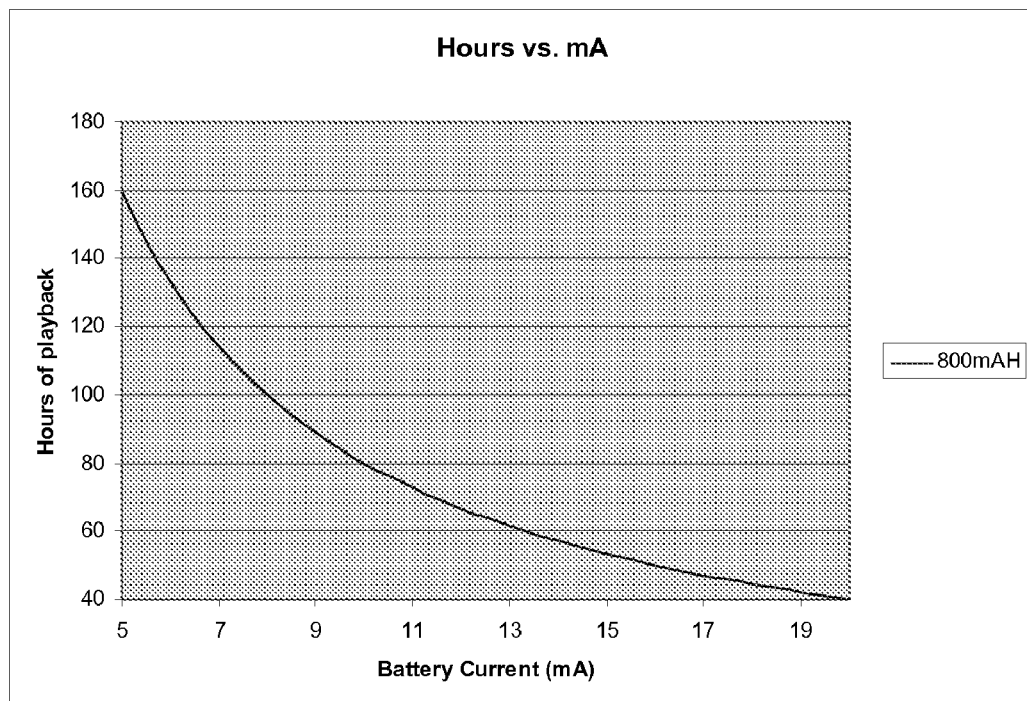

FIG. 6A illustrates a graph for total current consumed versus battery life.

Figure 6B:
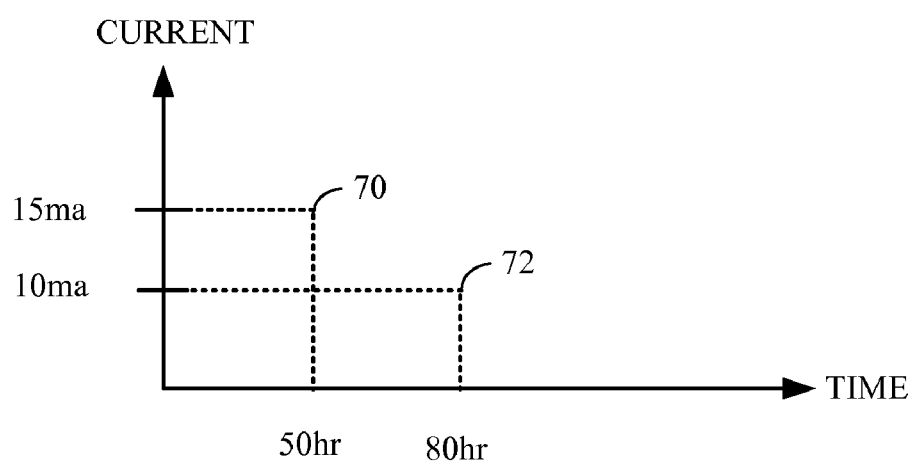

FIG. 6B is an exemplary graph illustrating the amount of battery life (in time) that may be used by the techniques/architectures described herein.

Figure 7:
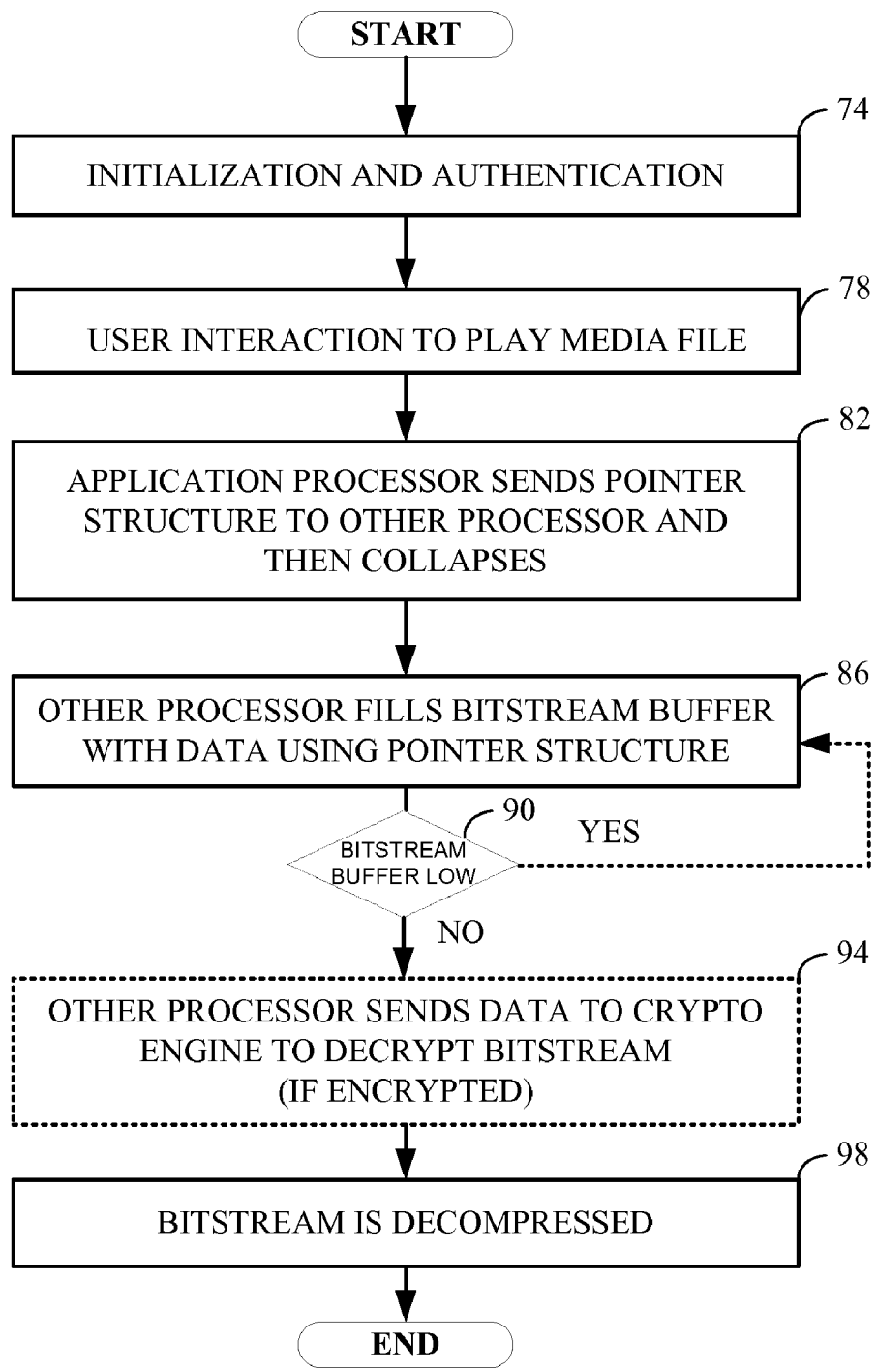
Figure 8:
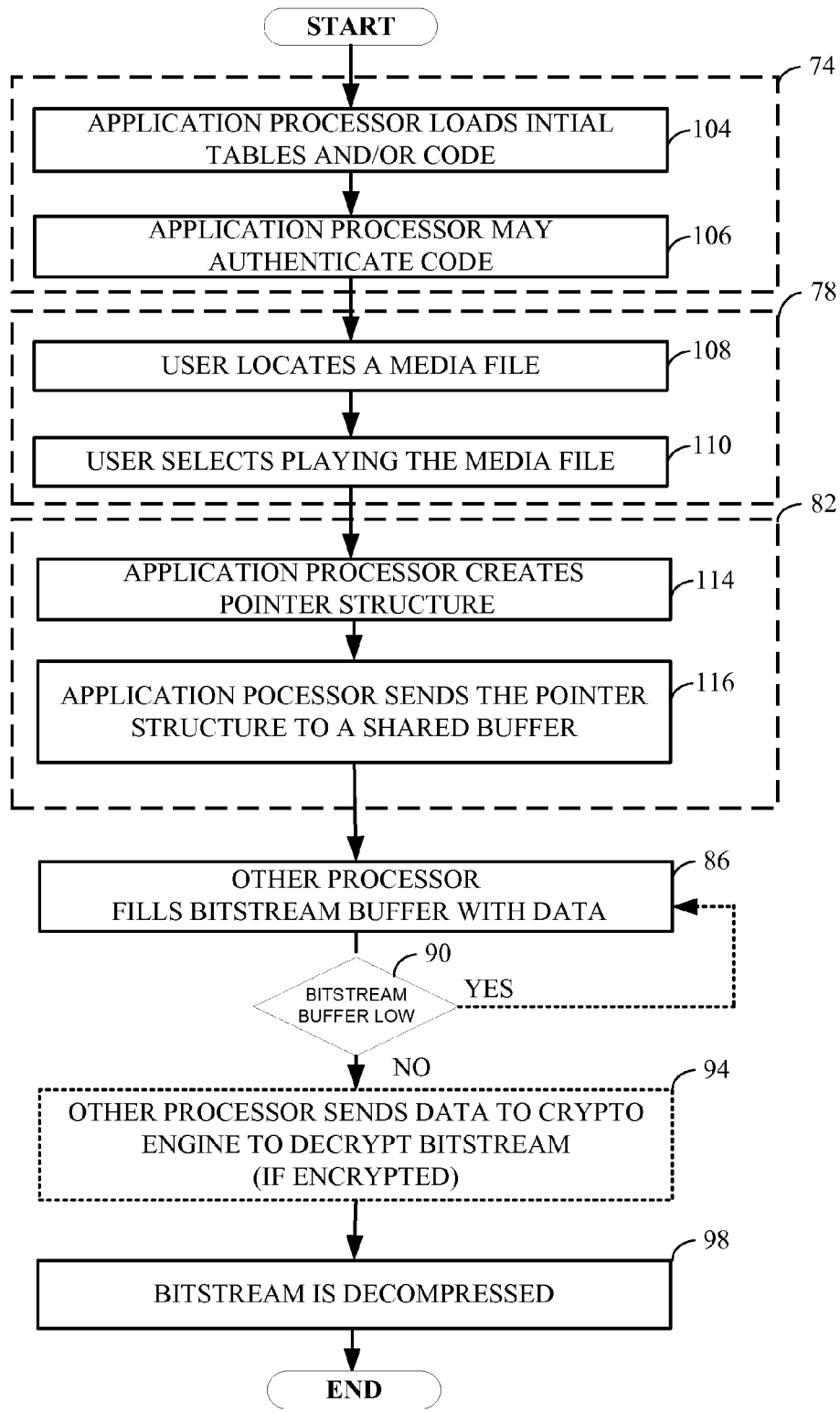

FIG. 7 and FIG. 8 illustrate flow charts of exemplary techniques for processing media files by using a different processor (other than) an application processor to retrieve files from memory.

DETAILED DESCRIPTION

Security in computing devices has become important in recent years. People are concerned about protecting their personal information which may be stored digitally. Music companies and Movie Studios, as well as artists, are also concerned that their content may be illegally copied. In many computing devices there exists a file system (also a software program), which works with different operating systems. With many operating systems a user can store data securely. The file system may do this by encrypting data in selected file system files and folders. There are various types of file systems which may do this, such as FAT, FAT16, FAT32, NTFS, or other propritary systems. Some systems, such as WinFS (Windows Future Storage) are currently being developed for the future. One such system that has gained popularity is NTFS. NTFS (New Technology File System) is an Encrypting File System (EFS) proprietary to Windows XP Vista 2003 2000 & NT (developed by Microsoft) or later operating systems, such as Windows Mobile 5.0, 6.0, 7.0 and the like. NTFS supports file-level security and file-compression. File compression (in this context) may be "additional" compression applied after the audio processing compression mentioned previously. EFS also exist on Windows mobile operating systems. Linux and Apple's operating systems have encrypting file systems that may be used as well. Because encrypting file systems are integrated with the file system, they are easy to manage, and difficult to attack. Once a file or folder is marked as encrypted, it is encrypted and transparent to the user.

In order to encrypt files and folders with Microsoft's EFS, a valid X.509 certificate is used. There may be other certificates used in the future. In cryptography, X.509 is an International Telecommunications Union (ITU)-T standard for public key infrastructure (PKI). X.509 specifies, among other things, standard formats for public key certificates and a certification path validation algorithm. The ITU is the leading United Nations agency for information and communication technologies. When a user attempts to encrypt data, the EFS looks for a valid certificate. If it doesn't find one, it may attempt to enroll for one with a with a Windows certification authority (CA). If it is unable to request a certificate through a CA, EFS may generate a self-signed certificate.

The file system software is part of an operating system loaded onto a processor (the application processor) in the computing device. In a mobile device, this is often an ARM processor. The ARM architecture is a 32-bit RISC processor architecture developed by ARM Limited that is widely used in a number of mobile devices. Because of their power saving features, ARM processors are dominant in the mobile electronics market, where low power consumption is a design goal. ARM Limited licenses the core ARM architecture to many companies who make their own application processor. Other type of processors may also serve as application processors.

Typically the application processor works with a digital signal processor (DSP) together to execute ("run") a user application, such as playing a media file, such as a song, or a video. DSP's are designed to perform specialized functions or operations. The DSP's typically "offload" some of the processing from the application processor. As such, DSP's, do not have an operating system loaded on them that contains a file system. Having a file system run on a DSP may introduce a lot of complexity. Hence, a file system is loaded on the application processor(s). Because media files are stored securely in memory using a file system, it is the application processor that retrieves the bitstream (or encrypted bitstream) from memory. Media files may be audio files, video files, or a combination of audio and video files. Audio files may be a song, a ringtone, or some other form of natural or synthetic stored recording. Video files may be a video clip, a picture, or several pictures. The combination of audio and video files may be a music video, a movie, a cartoon, or any other such media content.

Figure 1:
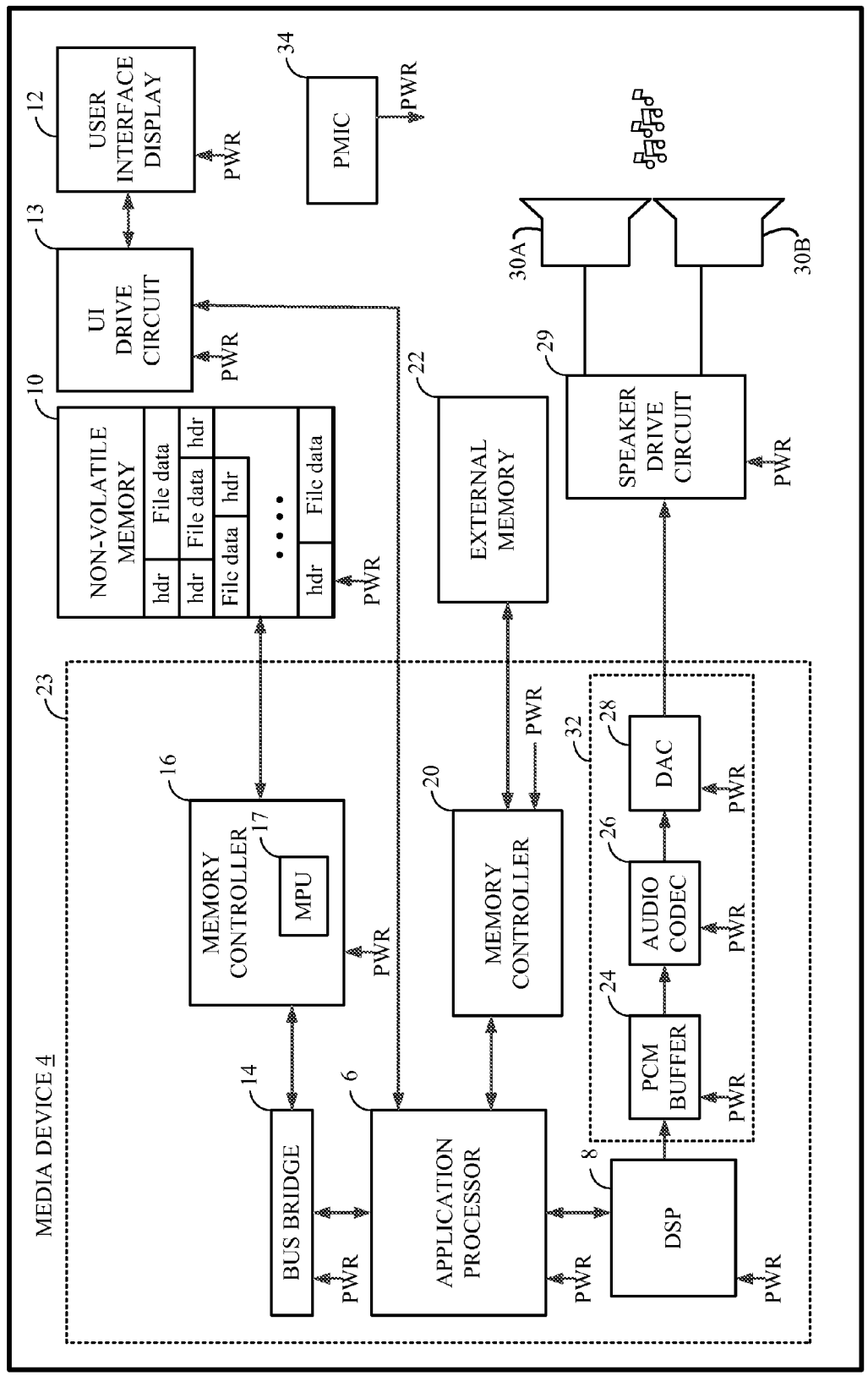
FIG. 1 is a block diagram illustrating an exemplary media device that implements techniques for processing audio files by using an application processor to retrieve the files from memory and pass the data in the files to a DSP.

FIG. 1 is a block diagram illustrating an exemplary media device that implements techniques for processing audio files by using an application processor to retrieve the files from memory and pass the data in the files to a DSP. The exemplary media device 4, has an application processor 6 which determines which firmware image to load into DSP/SHW 8, depending on the application being run on the media device 4. Firmware is typically the name of the software that runs on a DSP. In an application where a user selects a media file to play, the media file may initially be stored in non-volatile memory 10. Non-volatile memory means that the data stored is still present after power is removed. Examples of non-volatile memory are memory cards, on board and memory, and flash RAM (Random Access Memory).

Flash RAM whether on-chip or off-chip (such as NAND-based removable media format) is popular in today's communication devices. Some examples, of NAND-based removable media format, are MultiMediaCard, Secure Digital, Memory Stick and xD-Picture Card, RS-MMC, miniSD and microSD, and Intelligent Stick. Over the last few years, the Open NAND Flash Interface (ONFI) consortium has been working on establishing open standards for NAND flash memory chips and devices that communicate with them.

When the user selects the audio file via the UT display 12, driven by UT driver circuit 13. The application processor 6 may retrieve audio file data via the bus bridge 14 and a memory controller 16, from the non-volatile memory 10. The retrieval of the media file data from the non-volatime memory 10 may be referred to as the "bitstream task". Although, depending on the format of the media file, the media file data may contain a header or other meta data, and a content portion which comprises the bitstream. The bus bridge 14 may serve as an interface between different buses which are part of different components (e.g., a processor and a memory). For example, the application processor may have an AMBA High-performance Bus (AHB). AMBA stands for advanced microprocessor bus architecture. The bus bridge 14 may serve as a master AHB interface, an AHB slave interface, or a memory bus interface. The data read from the non-volatile memory 10 may then be written via a memory controller 20 (and another bus bridge (not shown) to another (non-volatile memory may also be external) external memory 22. Examples of external memory 22 may be SDRAM (synchronous dynamic access memory). External memory 22 is "external" to the integrated circuit 23 that may include one or more application processor(s) and one or more DSPs. As mentioned directly above, non-volatile memory may also be external to the integrated circuit 23.

In order to hear and/or see the media file, the "bitstream" has to be decompressed. One of the functions performed by the DSP/SHW 8 is to decompress the bitstream. Different types of architectures may be used to write the bitstream to the DSP/SHW 8. The bitstream may be DME'd (Direct Memory Exchanged) from the external memory 22. There also may be an application data mover (ADM) which may write the bitstream into the DSP/SHW 8. Both of these techniques (DME and ADM) require coordination via the application processor 6.

Once the DSP/SHW 8 reads the bitstream it decompresses it, and if the bitstream is audio file data, decompression produces Pulse Code Modulated (PCM) samples which are placed into a PCM Buffer 24 and read by an audio codec 26. The PCM Buffer 24 and/or the audio codec 26 may either be located in the DSP/SHW 8 or outside the DSP/SHW 8. A digital to analog coverter (ADC) 28 converts the digital samples from the codec 26 into an analog voltage waveform that a speaker drive circuit 29 uses to drive one or more speakers 30A and 30B. Any combination of the PCM Buffer 24, the audio codec 26, and the ADC 28 may be integrated together, and may be referred to as an "integrated codec" 32. There may be a power management integrated circuit (PMIC) 34 which supplies power to all of the components located in the media device 4. If the bitstream is video file data, the DSP/SHW 8 decompresses the bitstream to produce pixels which are processed by a video codec 49 and places the pixels in a pixel buffer 141 (see FIG. 2B), which are processed by a video codec 49 and places the pixels in a pixel buffer 141. The pixels may be further processed by a display processor 50 and sent to a display. The video codec 49 and/or the pixel buffer 141 may be located inside or outside the DSP/SHW 8, or in some configurations incorporated into the display processor 50.

As mentioned previously, any of the computing devices mentioned previously are considered "media devices". As such, the exemplary media device 4, illustrated in the figures herein, may be included in a desktop computer, a laptop computer, a workstation, a wireless communication device, a wireless mobile device, a personal digital assistant (PDA), a smart phone, an iPod, an MP3 player, a handheld gaming unit, or other media players, and a wide variety of other consumer devices.

For the exemplary purposes, the designation "DSP/SHW" is used herein to illustrate that a DSP or specialized hardware (SHW) may be used in some cases, depending on the requirements of the designers.

FIG. 2A is a block diagram illustrating an exemplary media device 5 that implements techniques for processing audio files by using a different processor (other than an application processor) to retrieve audio file data from memory by using a pointer structure generated by the application processor 6. FIG. 2A illustrates a DSP/SHW as the other processor which may retrieve audio file data from the non-volatile memory 10. However, a different processor, such as a peripheral processor may be substituted in the DSP/SHW's place and illustrate the concepts and techniques herein. A peripheral processor is a processor that does not necessarily have all the "bells and whistles" as the application processor 6. The other processor, whether a peripheral processor or a DSP/SHW, is a specialized processor that typically consumes a lot less power and may have less capabilities than the application processor 6, and is thus used for specialized tasks, such as retrieving audio file data. Using another processor, such as a DSP/SHW or peripheral processor, allows the media device 5 to switch to a "low power mode", during the bitstream task.

Having a file system run on a DSP/SHW 8 introduces complexity, so the file system is loaded on the application processor 6. Because the application processor 6 has the file system loaded, it is able to read the header and data information of the audio file data. The application processor 6 may then generate a pointer structure of how audio files store the audio data in memory. The pointer structure is generated by creating a list. The list comprises addresses, offsets and lengths of the audio file(s). The offsets account for padding data that may be present in the audio file—such as ID3 metadata for MP3 audio files. The list may also set the corresponding addresses, offsets and length of the audio file(s) when a user either has fast-forwarded or rewound where in the audio file he or she was previously listening from. The application processor 6 may then create a driver detailed specification which includes page length, command words, etc., which may only need to be sent a limited number of times to the DSP/SHW 8. For example, during startup or initial communication between the application processor 6 and DSP/SHW 8 the driver detailed specification may be sent to the DSP/SHW 8 or directly saved in a shared memory space, such as the shared buffer 40, where the DSP/SHW 8 can access it. The method by which the DSP/SHW 8 obtains the pointer structure (including the list) may be done in a similar fashion, i.e., the pointer structure may be sent by the application processor 6 to the DSP/SHW 8 where the DSP/SHW 8 writes the pointer structure to a shared memory space, such as the shared buffer 40, or the pointer structure may be written by the application processor 6 to a shared memory space, such as the shared buffer 40.

The shared buffer 40 may be located locally in the DSP/SHW 8 or alternatively, the shared buffer 40 may be located outside the DSP/SHW 8. If the page length changes, then the DSP/SHW 8 will need an updated driver detailed specification. However, if the page length and command words remained unchanged, then the DSP/SHW 8 may only require an updated list. Thus, the pointer structure may comprise the list, the driver detailed specification, or the list and the driver detailed specification depending on the circumstances. Typically the application processor 6 and the DSP/SHW 8 have various "handshake" mechanisms to communicate with each other. Once the pointer structure is stored in the shared buffer 40, the application processor 6 may "collapse" or shut down its power. When the application processor 6 collapses it enters a "sleep mode", where it consumes less power than before. At this point, the DSP/SHW 8 may read from the shared buffer 40 the number of bytes at each "pointer location", i.e., a memory location in the non-volatile memory 10, that should be retrieved and placed in the bitstream buffer 44.

As in the case of the shared buffer 40, the bitstream buffer 44 may also be located locally in the DSP/SHW 8 or, alternatively, outside the DSP/SHW 8. When the data in non-volatile memory 10 is encrypted, the DSP/SHW 8 may either decrypt the data in bitstream buffer 44 with a "crypto engine" (local to the DSP/SHW) or send the encrypted data to a "crypto engine accelerator" 46. In an alternate embodiment, if a crypto engine accelerator 46 is used, it is located on a separate integrated circuit, other than the exemplary integrated circuit 45 shown in FIG. 2A. The accelerator may be a specialized piece of hardware, often an application specific integrated circuit (ASIC) which is able to more quickly decrypt the data and pass the data (which is still a bitstream) into a designated area in the bitstream buffer 44. The DSP/SHW 8 may then decompress (also known as decoding) the bitstream and play the audio file as before. There is a small lag of time between when the DSP/SHW 8 retrieves, i.e., reads from the non-volatile memory 10 and the decompressed bitstream (the PCM samples) is played out of a speaker. Though the lag of time may be around one second, with processor (both application processors and DSP/SHW's) speeds increasing, it is anticipated that the lag time will decrease in the future.

As illustrated in FIG. 2A, the DSP/SHW 8 is able to directly retrieve data from non-volatile memory 10 via the bus bridge 14 and the memory controller 16 because the (memory protection unit) MPU 17 may be programmed to allow the DSP/SHW 8 to access the non-volatile memory 10 directly. Other memory controller's MPU's are not shown for the sake of clarity. In some architectures, the DSP/SHW 8 may interface directly with either the memory controller 16 (without going through the bus bridge 14) or the non-volatile memory 10 (without going through the memory controller 16). Direct memory access by the DSP/SHW 8 saves power, and ultimately increases the playback time for the media device 5, since the battery is not drained as quickly.

During creation of the pointer structure and/or playback of the media file, access to the non-volatile memory 10 may be blocked to all other components in the media device (media device 5, media device 7, media device 52, media device 53, or any other similar media device) other than DSP/SHW 8 and application processor 6 to prevent corruption of integrity of the pointer structure. The application processor 6 may recall flash access at any time for concurrent tasks. When this happens the application processor 6 may take over the bitstream task from the DSP/SHW 8 until the concurrent task is completed. After the concurrent task is completed, the application processor 6 may return control of the bitstream task to the DSP/SHW 8.

The DSP/SHW 8 may have an open or closed architecture. If the DSP/SHW architecture is open, other peripherals or threads may be able to access the audio file data and possibly corrupt it. It is thus desirable to use a closed DSP/SHW architecture when having the DSP/SHW 8 retrieve the bitstream from the non-volatile memory 10. With a closed DSP/SHW architecture the DSP/SHW 8 may be "trusted". As such, the audio file data retrieved from the non-volatile memory 10 may not be accessed by other threads or peripherals, as may be the case with an open DSP/SHW architecture.

FIG. 2B is a block diagram illustrating an exemplary media device 7 that implements techniques for processing video files by using a different processor (other than) an application processor to retrieve the files from memory. For illustrative purposes, speakers, an audio driver circuit, an ADC and other similar components are not shown. The techniques and alternative architectures of FIG. 2A discussed above are directly applicable to FIG. 2B. A bitstream buffer 48 contains a bitstream which is compressed video file data, which the DSP/SHW 8 decompresses to produce pixels. The pixels are processed by use of a video codec 49 and places the pixels in a pixel buffer 141. The pixels may be further processed by a display processor 50 and sent to a display. The video codec 49 and/or the pixel buffer 141 may be located inside or outside the DSP/SHW 8, or in some configurations incorporated into the display processor 50.

In an alternate embodiment, the common architecture illustrated between FIG. 2A and FIG. 2B and the differences between the architectures illustrated between FIG. 2A and FIG. 2B form the media device 130 illustrated in FIG. 2C. The media device 130 includes all the blocks of FIG. 2A, the bitstream buffer 48, the pixel buffer 141, and the video codec 49.

The video codec 49 and/or the pixel buffer 141 may be located inside or outside the DSP/SHW 8, or in some configurations incorporated into the display processor 50. Similarly, one or more of the components of the integrated audio codec 32 may be located inside or outside the DSP/SHW 8. In the media device 130, the DSP/SHW 8 may decompress bitstreams that are video file data and audio file data. In some cases, all the components illustrated in the integrated circuit 45 in FIG. 2A, and all the components illustrated in the integrated circuit 47 and may be integrated in one integrated circuit 51.

The application processor 6 may also write to non-volatile memory 10. A flow diagram of the process of writing to the non-volatile memory 10 by the application processor 6 after the DSP/SHW 8 has been retrieving data from the non-volatile memory 10 is illustrated in FIG. 3. Before the write, the application processor 6 indicates to the DSP/SHW 8 to stop retrieving the block of memory it had already started to retrieve. The block may be one page of memory or some other pre-defined size designated by the application processor 6 during the generation of the pointer structure. Once the DSP/SHW 8 completes retrieving the block of memory, the DSP/SHW 8 responds by sending the application processor 6 an index or set of indices into the list and a page number. The page number may be either the last page retrieved or the next page to retrieve, or some other convenient page number. The DSP/SHW 8 continues to decompress the bitstream and the audio file continues to play the decompressed bitstream.

Once the DSP/SHW 8 finishes retrieving media data from the non-volatile memory 10, the application processor 6 may then write to the non-volatile memory 10. Once the writing is completed, the application processor 6 re-creates the list and a new pointer structure, since the write may have caused the media file data to be shuffled, i.e., the non-volatile memory may become fragmented. The application processor 6 then sends the new pointer structure to the DSP/SHW 8 (or writes the new pointer structure directly into a shared memory space, as discussed above). The DSP/SHW 8 uses the new pointer structure and starts retrieving from the non-volatile memory 10 based on the re-created list.

The worst case time for the DSP/SHW 8 to respond to back to back "stop retrieves" is when the biggest block size read is divided by the smallest bit-rate of retrieving of non-volatile memory 10 by the DSP/SHW 8. As an example for audio files, if the biggest block size is 2.048 kilo-bytes (kb), and the smallest bit-rate is 5 kilo-bits per second (kbps), then the worst case response time for back to back "stop retrieving" commands is around 3.3 seconds. A typical response time for back-to-back "stop retrieving" command is 2.048 kilo bytes/ 128 kbps is around 128 ms. To improve the response time for a "stop retrieving" command, the DSP/SHW 8 may have to allocate around 2 kb of room in its bitstream buffer 44.

It should be noted that sometimes "retrieving" from the non-volatile memory is referred to as "reading" from the non-volatile memory.

During fast-forward and/or rewind selected by the user, the "step size" to jump ahead (fast forward) or behind (rewind) may be less than the block size. In this case, where the step size is less than the block size, the application processor 6 may re-create the list (comprising offsets and lengths) and new pointer structure based on the step size. The architecture in FIG. 1, FIG. 4A, FIG. 4B, FIG. 4C, or other architectures may be used, if another list and new pointer structure is not created.

The same flow diagram may describe the process of writing to the non-volatile memory 10 by the application processor 6 after a different processor has been retrieving data from the non-volatile memory 10. The different processor such as a peripheral processor may be directly used instead of the DSP/ SHW 8 in FIG. 2A, FIG. 2B, or FIG. 2C, or as illustrated in FIG. 4A, FIG. 4B, or FIG. 4C.

To minimize the chance that there are not enough PCM samples to play, or there are not enough pixels to display, the application processor 6 may need to finish writing to the non-volatile-memory 10 before the DSP/SHW 8 runs out of bits to decompress from the bitstream buffer 44. As an example for audio files, the worst case time for a back to back write of one audio frame is around 12 ms for MP3 audio files.

FIG. 4A is an alternate embodiment of FIG. 2A. As mentioned previously, using another processor, such as a DSP/ SHW or peripheral processor, allows the media device 52 to switch to a "low power mode", during the bitstream task, i.e., the media device 52 switches from using the application processor 6 to retrieve audio file data via a bus 55 (or another bus path) to using a peripheral processor 54. This may be accomplished by having the pointer structure (as described before) stored in a shared memory space, such as shared buffer 56. Although a peripheral processor, such as a peripheral processor 54 illustrated in FIG. 4A, may retrieve the audio file data from the non-volatile memory 10, it may be desirable for a DSP/SHW, such as the DSP/SHW 9 illustrated in FIG. 4A, to decompress the bitstream. This may be accomplished by having the peripheral processor 54 store the bitstream in the bitstream buffer 58, so that the DSP/SHW 9 may decode the bitstream. It is desirable to have both the peripheral processor 54 and the DSP/SHW 9, along with the application processor 6 and the other components illustrated integrated into a single integrated circuit 59, although in some embodiments the processors may be on separate integrated circuits.

FIG. 4B is an alternate embodiment of FIG. 2B. In this alternate embodiment (the video file data version of FIG. 4A), the other processor may also be a DSP/SHW or peripheral processor, allowing the media device 53 to switch to a "low power mode", during the bitstream task, i.e., the media device 53 switches from using the application processor 6 to retrieve video file data via a bus 55 (or another bus path) to using a peripheral processor 54. This may be accomplished by having the pointer structure (as described before) stored in a shared memory space, such as shared buffer 56. Although a peripheral processor, such as a peripheral processor 54 illustrated in FIG. 4B, may retrieve the video file data from the non-volatile memory 10, it may be desirable for a DSP/SHW, such as the DSP/SHW 9 illustrated in FIG. 4B, to decompress the bitstream. This may be accomplished by having the peripheral processor 54 store the bitstream in the bitstream buffer 58, so that the DSP/SHW 9 may decode the bitstream. It is desirable to have both the peripheral processor 54 and the DSP/SHW 9, along with the application processor 6 and the other components illustrated integrated into a single integrated circuit 60, although in some embodiments the processors may be on separate integrated circuits.

In an alternate embodiment, the common architecture illustrated between FIG. 4A and FIG. 4B and the differences between the architectures illustrated between FIG. 4A and FIG. 4B form the media device 140 illustrated in FIG. 4C. The media device 140 includes all the blocks of FIG. 4A, the bitstream buffer 48, the pixel buffer 141, and the video codec 49.

The video codec 49 and/or the pixel buffer 141 may be located inside or outside the DSP/SHW 8, or in some configurations incorporated into the display processor 50. Similarly, one or more of the components of the integrated audio codec 32 may be located inside or outside the DSP/SHW 8.

In the media device 140, the DSP/SHW 9 may decompress bitstreams that are video file data and audio file data. In some cases, all the components illustrated in the integrated circuit 59 in FIG. 4A, and all the components illustrated in the integrated circuit 60 and may be integrated in one integrated circuit 61. A bitstream buffer 48, in the media device 140 may be segmented into two or more buffers to handle the bitstreams of the audio and video file data.

The architecture illustrated in FIG. 4A, FIG. 4B, or FIG. 4C may be desirable when the DSP/SHW 9 is not trusted, i.e., the DSP/SHW has an open architecture. The peripheral processor 54 may be trusted, and thus may prevent other threads or peripheral components from corrupting the audio file data retrieved from the non-volatile memory 10.

In the architectures illustrated in FIGS. 2A, 2B, 2C, 4A, 4B, 4C, and their alternative embodiments, power consumption may be reduced in a media device. The media device includes a first processor, such as an application processor. The first processor may be coupled to the non-volatile memory, either directly or indirectly (via various paths, e.g., via a bus bridge, a peripheral processor, a DSP or SHW, a memory controller, or any other similar component) allowing the first processor to generate a pointer structure of how the media stores the media data in non-volatile memory. The pointer structure comprises a location and size (i.e., addresses, offsets and lengths) of the media data stored in the non-volatile memory. The first processor may be coupled, either directly or indirectly (via various paths, e.g., via a bus bridge, a peripheral processor, a DSP or SHW, a memory controller, or any other similar component) to a memory space, allowing the first processor to store, i.e., write the pointer structure in the memory space. The first processor may enter into a sleep mode after writing the pointer structure to the memory space. If the first processor does not enter into the sleep mode it may continue to operate in a normal mode. The second processor, such as a DSP/SHW or peripheral processor, may be also be coupled, either directly or indirectly (via various paths, e.g., via a bus bridge, a peripheral processor, an application processor, a memory controller, or any other similar component) to the memory space, allowing the second processor, based on the pointer structure, to retrieve a block of media data from the non-volatile memory. Retrieval of the block of media data may be retrieved directly from the non-volatile memory, or in some cases, the media data being retrieved may be parsed. The media data may be audio file data, video file data, or both. If there is a concurrent task, the first processor may write to the non-volatile memory after the second processor finishes retrieving the block of the media data from the non-volatile memory. In such a case, a pointer structure is re-created after the concurrent task finishes. During fast-forward or rewind, the first processor may recreate a new pointer structure based on a step size smaller than the block of the retrieved media data.

FIG. 5 illustrates battery 62 driving a PMIC 64. The PMIC 64 may have various power modules in it to drive different types of components. For example, MSMC1 65 drives the core components, such as, the modem, various bus bridges, and the DSP/SHW. MSMC2 66 drives the application processor 6. MSMSA 67 drives the analog codec, and MSME 68 drives various memories. Each of these memory power modules consume current, the total current consumed affects how many hours the battery will last, and hence, how many hours of play may be heard for the media device 5, media device 7, media device 130, media device 52, media device 53, media device 140 or any other alternate embodiments of these media devices.

Batteries have different ratings. Illustrated in FIG. 6A is an exponential decaying curve for a battery with an 800 mA-Hr rating. As seen in the graph, when the current consumed is low the amount of battery life is high (e.g., at 5 mA the total battery life (hours of playback) is around 160 hours).

FIG. 6B is an exemplary graph illustrating the amount of battery life (in time) that may be used by the techniques described in FIG. 1 and FIG. 2A (or FIG. 4A). For example, the media device 4 in FIG. 1, may consume 15 mA of current and be capable of playing around 50 hours of playback (or battery life consumed) time. However, for the media device 5 in FIG. 2A, 10 mA of current may be consumed, and thus, be capable of around 80 hours of playback time. Hence, it can be seen that using the DSP/SHW 8 with the pointer structure in the shared memory buffer 40, may result in less power consumption for media device 5, and hence more playback time to listen to the audio file(s). Similar low current consumption may be achieved with the media device 52 illustrated in FIG. 4A. As battery technology improves, it can be seen that playback times of 50 hours and 80 hours may increase, as batteries may become more efficient. The exemplary graph is used to illustrate that by using the architectures illustrated in FIG. 2A, FIG. 2B, FIG. 2C, FIG. 4A, FIG. 4B, and FIG. 4C, or any alternate embodiments of these architectures, a media device may be capable of longer playback time of an audio file or a longer playback of a video file. During low power mode the media device switches from using an application processor to using another processor, such as a DSP/SHW or peripheral processor.

FIGS. 7 and 8 are flow charts illustrating exemplary techniques for processing media files by using the other processor" (other than the application processor 6) to retrieve files from memory. FIG. 8. is a more detailed illustration of FIG. 7. First, there may be an initialization and authentication 74 of the code on the other processor. This comprises the application processor 6 loading code and/or tables 104, and if required the application processor 6 may authenticate the code 106, for example firmware. Then there is an interaction by the user to play a media file 78. This may include the user looking at the user interface display 10 and scrolling through a software menu to locate a media file 108. After the media file is found, the user may select playing the media file 110 by pressing a button either on a touch-screen, a keypad, speech-recognition, or any other method for selecting a media file for playback. This action by the user may initiate the application processor 6 to generate the pointer structure 114. After writing the pointer structure 116 to a shared memory buffer, the application processor 6 may then shut down its power 82. This saves the battery from using current and may increase the playback time of the media devices (5, 7, 130, 52, 53, and 140) illustrated in FIG. 2A, FIG. 2B, FIG. 2C, FIG. 4A, FIG. 4B and FIG. 4C, respectively, or any alternate embodiments of these media devices. In embodiments which have another processor capable of retrieving from non-volatile memory, the other processor fills a bitstream buffer by using the pointer structure 86 in a shared memory buffer.

The other processor may optionally monitor the bitstream buffer. If the bitstream buffer is not running low on entries, the other processor may decrypt the bitstream by sending the data to a crypto engine or crypto engine accelerator, if the bitstream is encrypted. If the bitstream buffer is low (NO branch of 90) the other processor fills the bitstream buffer with data (i.e. a bitstream) by using the pointer structure. After the bitstream is decrypted (or in the case where it is not decrypted) the bitstream is still compressed. The other processor decodes (i.e., decompresses) the bitstream. If the bitstream is audio file data, PCM samples are generated and placed in a PCM buffer. The audio codec reads the PCM buffer and the PCM samples are converted to an analog waveform that is played out of the speakers. If the bitstream is video file data pixels are generated and placed in a pixel buffer. A display processor may process the pixels and send them to be displayed. In FIG. 4A, FIG. 4B or FIG. 4C, the DSP/SHW preferably decodes the bitstream, although in alternative embodiments, the peripheral processor may perform this function.

One or more aspects of the techniques described herein may be implemented in hardware, software, firmware, or combinations thereof. Any features described as modules or components may be implemented together in an integrated logic device or separately as discrete but interoperable logic devices. If implemented in software, one or more aspects of the techniques may be realized at least in part by a non-transitory computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured or adapted to perform the techniques of this disclosure.

The configurations described herein may be implemented in part or in whole as a hard-wired circuit, as a circuit configuration fabricated into an application-specific integrated circuit, or as a firmware program loaded into non-volatile storage or a software program loaded from or into a computer-readable medium as machine-readable code, such code being instructions executable by an array of logic elements such as a microprocessor or other digital signal processing unit. The computer-readable medium may be an array of storage elements such as semiconductor memory (which may include without limitation dynamic or static RAM (random-access memory), ROM (read-only memory), and/or flash RAM), or ferroelectric, magneto-resistive, ovonic, polymeric, or phase-change memory; a disk medium such as a magnetic or optical disk; or any other computer-readable medium for data storage. The term "software" should be understood to include source code, assembly language code, machine code, binary code, firmware, macrocode, microcode, any one or more sets or sequences of instructions executable by an array of logic elements, and any combination of such examples.

If implemented in hardware, one or more aspects of this disclosure may be directed to a circuit, such as an integrated circuit, chipset, ASIC, FPGA, logic, or various combinations thereof configured or adapted to perform one or more of the techniques described herein. The circuit may include both the processor and one or more hardware units, as described herein, in an integrated circuit or chipset.

It should also be noted that a person having ordinary skill in the art will recognize that a circuit may implement some or all of the functions described above. There may be one circuit that implements all the functions, or there may also be multiple sections of a circuit that implement the functions. With current mobile platform technologies used in many media devices, an integrated circuit may comprise at least one DSP, and at least one Advanced Reduced Instruction Set Computer (RISC) Machine (ARM) processor to control and/or communicate to a DSP or DSPs. Furthermore, a circuit may be designed or implemented in several sections, and in some cases, sections may be re-used to perform the different functions described in this disclosure.

Various aspects and examples have been described. However, modifications can be made to the structure or techniques of this disclosure without departing from the scope of the following claims. For example, other types of devices could also implement the processing techniques described herein. These and other examples are within the scope of the following claims. Each of the methods disclosed herein may also be tangibly embodied (for example, in one or more computer-readable media as listed above) as one or more sets of instructions readable and/or executable by a machine including an array of logic elements (e.g., a processor, microprocessor, microcontroller, or other finite state machine). Thus, the present disclosure is not intended to be limited to the configurations or architectures shown above but rather is to be accorded the widest scope consistent with the principles and novel features disclosed in any fashion herein, including in the attached claims as filed, which form a part of the original disclosure.

Other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A method of reducing power in a media device comprising:
    generating a pointer structure, by a first processor, of media data stored in a volatile non-volatile memory;
    writing the pointer structure, by the first processor, into a memory space which is accessible by a second processor;
    placing the first processor into a sleep mode as a result of writing the pointer structure to the memory space;
    reading the pointer structure from the memory space, by the second processor; and
    retrieving a block of the media data from the non-volatile memory, by the second processor, based on the pointer structure.

2. The method of claim 1, wherein the first processor is an application processor.

3. The method of claim 1, wherein the second processor is a digital signal processor.

4. The method of claim 1, wherein the second processor is a peripheral processor.

5. The method of claim 1, wherein the media data is audio file data.

6. The method of claim 1, wherein the media data is video file data.

7. The method of claim 1, wherein at least a portion of the block of the media data retrieved by the second processor is written to a bitstream buffer.

8. The method of claim 7, wherein the second processor monitors if the bitstream buffer is low.

9. The method of claim 7, wherein the second processor decrypts the at least a portion of the media data retrieved.

10. The method of claim 7, wherein the second processor sends the at least a portion of the media data retrieved to a crypto engine accelerator.

11. The method of claim 1, wherein the first processor writes to the non-volatile memory after the second processor finishes retrieving the block of the media data from the non-volatile memory, if there is a concurrent task.

12. The method of claim 11, wherein a pointer structure is re-created after the concurrent task finishes.

13. The method of claim 1, wherein generating the pointer structure, by the first processor, is initiated by selection of an audio file or video file from a user of the media device.

14. The method of claim 1, wherein during fast-forward or rewind, the first processor recreates a new pointer structure based on a step size smaller than the block of the retrieved media data.

15. A media device comprising:
    a non-volatile memory with stored media data;
    a first processor, coupled to the non-volatile memory, configured to generate a pointer structure which comprises a location and size of the media data stored in the non-volatile memory;
    a memory space to store the pointer structure written by the first processor, wherein the first processor is further configured to enter a sleep mode as a result of writing the pointer structure to the memory space; and
    a second processor, configured to read the pointer structure from the memory space and, configured to retrieve a block of the media data from the non-volatile memory.

16. The media device of claim 15, wherein the first the first processor is an application processor.

17. The media device of claim 15, wherein the second processor is a digital signal processor.

18. The media device of claim 15, wherein the second processor is a peripheral processor.

19. The media device of claim 15, wherein the media data is audio file data.

20. The media device claim 15, wherein the media data is video file data.

21. The media device of claim 15, wherein at least a portion of the block of the media data retrieved by the second processor is written to a bitstream buffer.

22. The media device of claim 15, wherein the first processor writes to the non-volatile memory after the second processor finishes retrieving the block of the media data from the non-volatile memory, if there is a concurrent task.

23. The media device of claim 22, wherein a pointer structure is re-created after the concurrent task finishes.

24. The media device of claim 15, wherein during fast-forward or rewind, the application processor recreates a new pointer structure based on a step size smaller than the block of the retrieved media data.

25. A media device comprising:
   means for generating a pointer structure, by an application processor, of media data stored in a non-volatile memory;
   means for writing the pointer structure, by the application processor, into a memory space which is accessible by a different processor;
   means for placing the application processor into a sleep mode as a result of writing the pointer structure to the memory space;
   means for reading the pointer structure from the memory space, by the different processor; and
   means for retrieving the media data from the non-volatile memory, by the different processor, based on the pointer structure.

26. The media device of claim 25, wherein the different processor is either a digital signal processor or a peripheral processor.

27. The media device of claim 25, wherein the media data is audio file data.

28. The media device of claim 25, wherein the media data is video file data.

29. The media device of claim 25, wherein at least a portion of the media data retrieved by the second processor is written to a bitstream buffer.

30. The media device of claim 25, wherein a digital signal processor decrypts the at least a portion of the block of the media data retrieved.

31. The media device of claim 25, wherein the different processor sends the at least a portion of the block of the media data retrieved to a crypto engine accelerator.

32. The media device of claim 25, wherein during fast-forward or rewind, the first processor recreates a new pointer structure based on a step size smaller than the block of the retrieved media data.

33. A non-transitory computer-readable medium embodying a set of instructions executable by one or more processors, comprising:
   code for generating a pointer structure, by a first processor, of media data stored in a non-volatile memory;
   code for writing the pointer structure, by the first processor, into a memory space which is accessible by a second processor;
   code for placing the first processor into a sleep mode as a result of writing the pointer structure to the memory space;
   code for reading the pointer structure from the memory space, by the second processor; and
   code for retrieving a block of the media data from the non-volatile memory, by the second processor, based on the pointer structure.

34. The computer-readable medium of claim 33, wherein the first processor is an application processor.

35. The computer-readable medium of claim 34, wherein the media data is audio file data.

36. The computer-readable medium of claim 34, wherein the media data is video file data.

37. The computer-readable medium of claim 33, wherein the second processor is a digital signal processor.

38. The computer-readable medium of claim 33, wherein the second processor is a peripheral processor.

* * * * *